(12) United States Patent
Cochrane et al.

(10) Patent No.: US 11,312,197 B2
(45) Date of Patent: Apr. 26, 2022

(54) SHOCK CAP SYSTEM CONFIGURATION FOR WINDSHIELD FORWARD OF FRONT AXLE

(71) Applicant: GM GLOBAL TECHNOLOGY OPERATIONS LLC, Detroit, MI (US)

(72) Inventors: David Cochrane, Oshawa (CA); Chris Wisniewski, Oshawa (CA); Giles D. Bryer, Northvillle, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 18 days.

(21) Appl. No.: 16/888,631

(22) Filed: May 29, 2020

(65) Prior Publication Data

US 2021/0370735 A1 Dec. 2, 2021

(51) Int. Cl.
*B60G 13/00* (2006.01)

(52) U.S. Cl.
CPC ...... *B60G 13/003* (2013.01); *B60G 2204/128* (2013.01); *B60G 2206/90* (2013.01); *B60G 2206/91* (2013.01)

(58) Field of Classification Search
CPC .... B62D 21/11; B62D 25/081; B62D 25/088; B62D 65/04; B60G 13/00; B60G 13/001; B60G 13/003; B60G 15/00; B60G 15/067; B60G 15/068; B60G 2204/128
See application file for complete search history.

(56) References Cited

U.S. PATENT DOCUMENTS

| | | | | |
|---|---|---|---|---|
| 4,768,274 A | * | 9/1988 | Pinnow | A61G 21/00 29/401.1 |
| 9,186,948 B2 | * | 11/2015 | Patil | B60G 11/22 |
| 2007/0246971 A1 | * | 10/2007 | Hanakawa | B62D 25/081 296/203.01 |
| 2007/0267837 A1 | * | 11/2007 | Sanville | B60G 3/06 280/124.134 |
| 2017/0225715 A1 | * | 8/2017 | Kobayashi | B60N 2/015 |

FOREIGN PATENT DOCUMENTS

| | | | | |
|---|---|---|---|---|
| CN | 106335551 A | * | 1/2017 | B62D 25/16 |
| JP | 2002308149 A | * | 10/2002 | |

* cited by examiner

*Primary Examiner* — Paul N Dickson
*Assistant Examiner* — Caitlin Anne Miller
(74) *Attorney, Agent, or Firm* — Lorenz & Kopf, LLP

(57) ABSTRACT

In accordance with an exemplary embodiment, a vehicle is provided that includes: a body; a drive system configured to propel the body; and a suspension system coupled to the drive system, the suspension system including a shock cap assembly including: a strut component; a cap component attached to the strut component; and an attachment mechanism configured for attachment to a body of the vehicle, such that the shock cap assembly is configured to be accessed from a front wheel well of the vehicle.

17 Claims, 6 Drawing Sheets

SHOCK CAP SYSTEM CONFIGURATION FOR WINDSHIELD FORWARD OF FRONT AXLE

INTRODUCTION

The technical field generally relates to the field of vehicles and, more specifically, to shock cap systems for vehicles.

Many vehicles today include suspension systems having shock absorbers as well as a shock caps. On many vehicles, such systems are accessed from a front of the vehicle for installation, removal, and service. However, the present configuration of such systems may not always be optimal for certain types of vehicles, including in which a front windshield is disposed in front of or above the front axle of the vehicle, or in which a vehicle floor or occupant compartment, and/or one or more other compartments, may preclude access from above.

Accordingly, it is desirable to provide systems and methods for configuration of suspension systems for vehicle, including shock cap systems therefor, and including for vehicles in which the front windshield is disposed in front of the front axle of the vehicle or in which one or more other components may limit or preclude access from above. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a shock cap assembly for a suspension system of a vehicle is provided, the shock cap assembly including: a strut component; a cap component attached to the strut component; and an attachment mechanism configured for attachment to a body of the vehicle, such that the shock cap assembly is configured to be accessed from a front wheel well of the vehicle.

Also in an exemplary embodiment, the attachment mechanism includes a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another.

Also in an exemplary embodiment, the shock cap assembly is configured to be installed underneath a front windshield of the vehicle.

Also in an exemplary embodiment, the shock cap assembly is configured to be installed underneath the front windshield of the vehicle when the front windshield is disposed forward of a front axle of the vehicle.

Also in an exemplary embodiment, the shock cap assembly further includes a plurality of shock cap brackets configured to connect an integrated cross beam to shock caps of the shock cap assembly.

Also in an exemplary embodiment, the shock cap assembly further includes a plurality of shock tower brackets configured to attach to the shock caps to a windshield base structure of the front windshield.

Also in an exemplary embodiment, the integrated crossbeam, along with a chassis and front compartment rails, form a torsional hoop structure that provides mutual support between the shock cap assembly and the windshield base structure.

In another exemplary embodiment, a method includes: assembling a strut component of a suspension system for a vehicle to a cap component of the suspension system for the vehicle, generating a shock cap assembly for the vehicle; assembling a body for the vehicle, separate from the shock cap assembly; and installing the shock cap assembly into the body of the vehicle, subsequent to both the assembling of the shock cap assembly and the assembling of the body for the vehicle.

Also in an exemplary embodiment, the installing of the shock cap assembly into the body of the vehicle includes installing the shock cap assembly into the body of the vehicle via access through a front wheel well of the vehicle.

Also in an exemplary embodiment, the installing of the shock cap assembly into the vehicle includes bolting the shock cap assembly to the body of the vehicle via a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another.

Also in an exemplary embodiment, the installing of the shock cap assembly into the body of the vehicle includes installing the shock cap assembly into the body of the vehicle underneath a front windshield of the vehicle that is disposed forward of a front axle of the vehicle.

Also in an exemplary embodiment, the installing of the shock cap assembly into the body of the vehicle includes connecting an integrated cross beam to shock caps of the shock cap assembly via a plurality of shock cap brackets.

Also in an exemplary embodiment, the integrated crossbeam, along with a chassis and front compartment rails, form a torsional hoop structure that provides mutual support between the shock cap assembly and a windshield base structure of the front windshield.

In another exemplary embodiment, a vehicle is provided that includes: a body; a drive system configured to propel the body; and a suspension system coupled to the drive system, the suspension system including a shock cap assembly including: a strut component; a cap component attached to the strut component; and an attachment mechanism configured for attachment to a body of the vehicle, such that the shock cap assembly is configured to be accessed from a front wheel well of the vehicle.

Also in an exemplary embodiment, the attachment mechanism includes a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another.

Also in an exemplary embodiment, the vehicle further includes a front windshield, and the shock cap assembly is disposed underneath the front windshield.

Also in an exemplary embodiment, the front windshield is disposed forward of a front axle of the vehicle.

Also in an exemplary embodiment, the front windshield includes a windshield base structure, and the vehicle further includes an integrated cross beam connected to shock caps of the shock cap assembly via a plurality of shock cap brackets and integrated into the base of windshield.

Also in an exemplary embodiment, the shock caps are attached to the windshield base structure via a plurality of shock tower brackets.

Also in an exemplary embodiment, the integrated crossbeam, along with a chassis and front compartment rails, form a torsional hoop structure that provides mutual support between the shock cap assembly and the windshield base structure.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
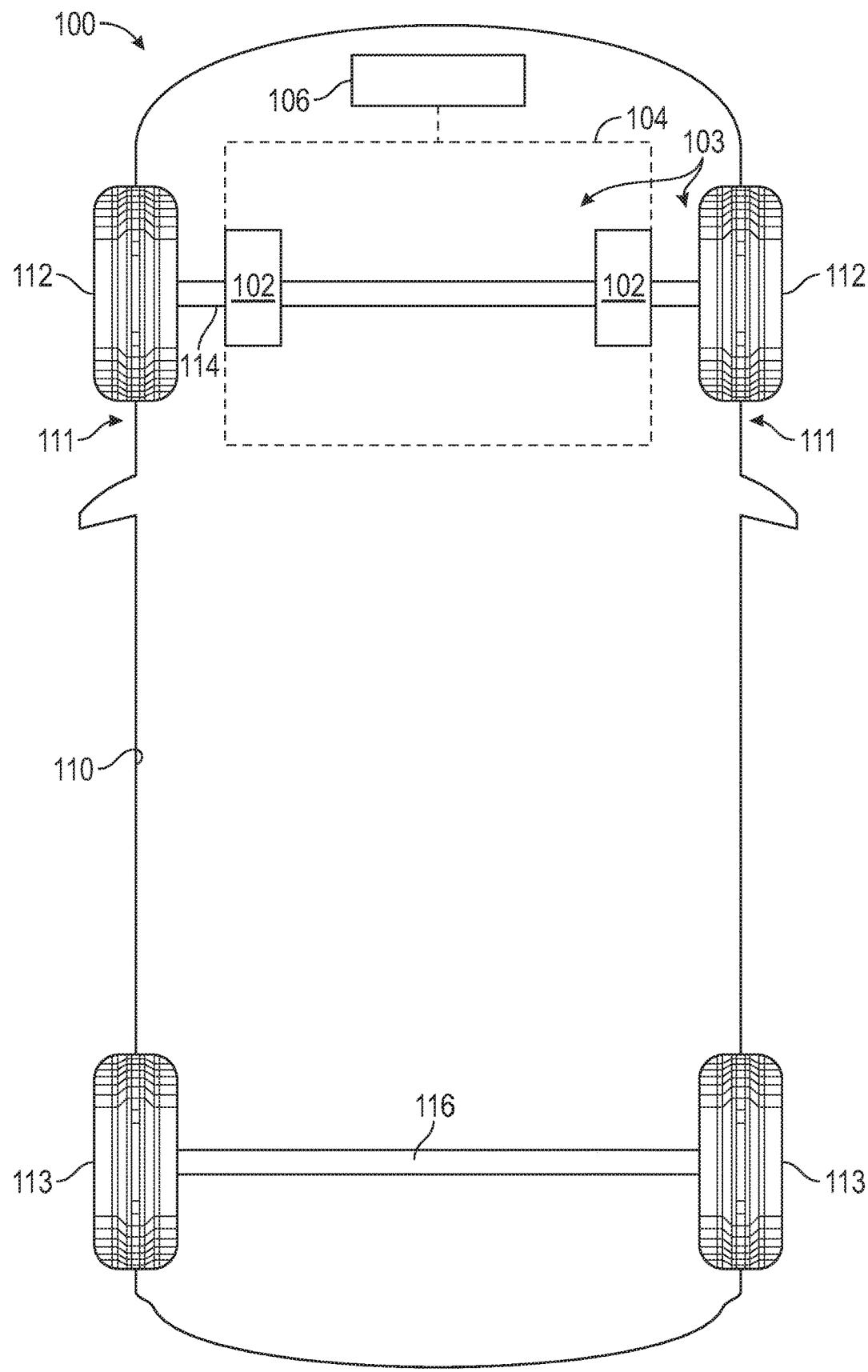
FIG. 1 is a functional block diagram of a vehicle that includes a shock cap assembly installed as part of a suspension system underneath a front windshield of the vehicle, in accordance with an exemplary embodiment.

FIG. 1 illustrates a vehicle 100, according to an exemplary embodiment. As described in greater detail further below, the vehicle 100 includes a shock cap assembly 102 that is installed underneath a front windshield of the vehicle 100 and related structure and related interior components. As described in greater detail further below, the shock cap assembly 102 is installed after assembly of a body 110 of the vehicle 100 (and, in various embodiments, after painting and after installation of the windshield structure for the vehicle), and is accessed from a passenger or driver side of the vehicle 100 in a front wheel well 111 of the vehicle 100 proximate front wheels 112 of the vehicle 100. Also as depicted in FIG. 1, in various embodiments the shock cap assembly 102 is part of a suspension system 103 of the vehicle 100, and is also coupled to a drive system 106 of the vehicle 100 (e.g., via connection of the suspension system 103 to the wheels 112 as part of the drive system 106).

In addition, in certain embodiments, the vehicle 100 includes a front axle 114 and a rear axle 116, and the front windshield 104 is disposed in front of the front axle 114. Also in various embodiments, the shock cap assembly 102 is also installed directly underneath the front windshield 104.

It is noted that the particular configuration and installation of the shock cap assembly 102 as described herein is particular useful for, but is not limited to, configurations in which a base of the windshield 104 extends in front of the front axle 114 and (along with related structure and related interior components) covers the shock towers from above. However, in certain embodiments, the windshield 104 may not be disposed in front of the front axle 114 and/or may not cover the shock towers from above. In such embodiments, the configuration and installation of the shock cap assembly 102 as described herein may still be particularly useful, for example in which a vehicle floor, occupant compartment, and/or other components may preclude access from above.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise one or more other types of vehicles. In addition, in various embodiments, it will also be appreciated that the vehicle 100 may comprise any number of other types of mobile platforms.

In the depicted embodiment, the body 110 of the vehicle 100 substantially encloses other components of the vehicle 100. Also in the depicted embodiment, the vehicle 100 includes the above-referenced axles 114, 116 and front wheels 112, as well as rear wheels 113. The wheels 112, 113 are each rotationally coupled to a respective one or more of the axles 114, 116 near a respective corner of the body 110 to facilitate movement of the vehicle 100. In one embodiment, the vehicle 100 includes four wheels 112, 113 (namely, two front wheels 112 and two rear wheels 113), although this may vary in other embodiments (for example for trucks and certain other vehicles).

In various embodiments, the drive system 106 drives the wheels 112, 113. The drive system 106 preferably comprises a propulsion system. In certain exemplary embodiments, the drive system 106 comprises an internal combustion engine and/or an electric motor/generator. In certain embodiments, the drive system 106 may vary, and/or two or more drive systems 106 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments the suspension system 103 supports road handling and ride quality for the vehicle 100. In various embodiments, the suspension system 103 comprises a number of components, such as the shock cap assembly 102 as well as tires, springs, and the like that connect the body 110 of the vehicle 100 to the wheels 112, 113, that allow relative motion therebetween, and that support both road handling and ride quality.

Figure 2:
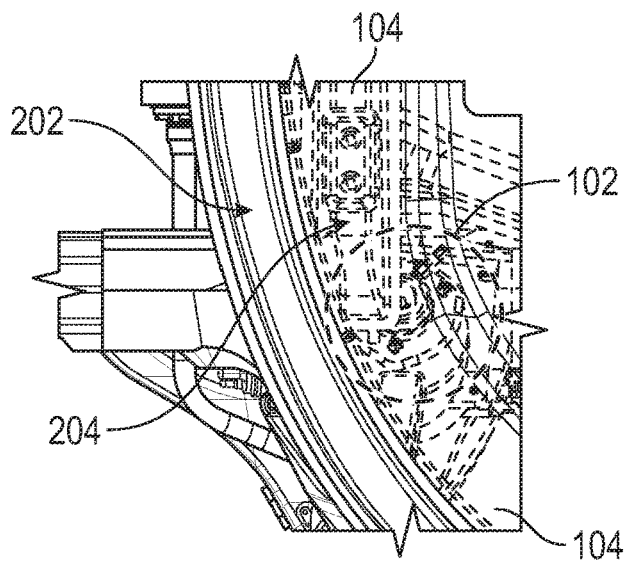
FIGS. 2-4 are different perspective views of the shock cap assembly of FIG. 1, in accordance with an exemplary embodiment.
Figure 3:
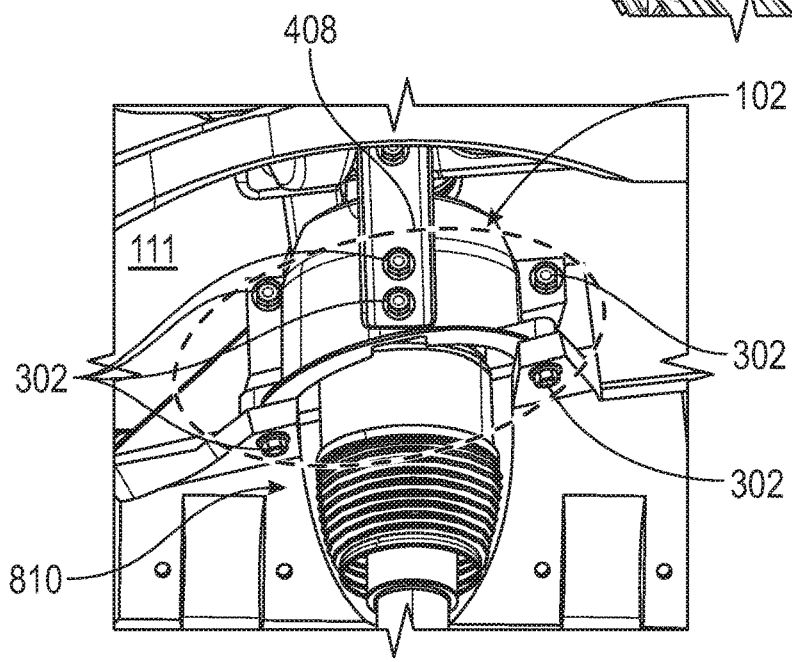
Figure 4:
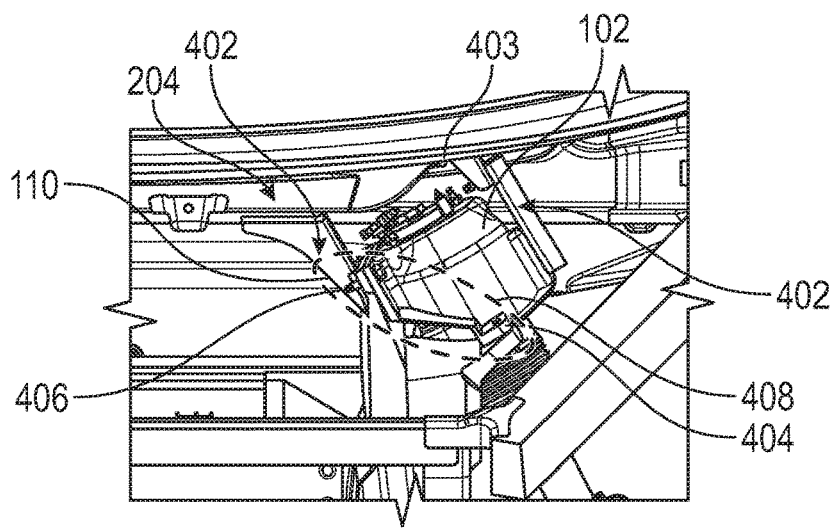

FIGS. 2-4 are different perspective views of the shock cap assembly 102 of FIG. 1, in accordance with an exemplary embodiment. First, FIG. 2 shows a top perspective view of the shock cap assembly 102 as it is installed in the vehicle 100. As shown in FIG. 2, the shock cap assembly 102 is installed directly underneath the windshield 104. Also depicted in FIG. 2 are a base of windshield reinforcement (or support structure) 202 and a tower-to-tower brace (also referred to herein as an integrated brace) 204 (described further below).

FIG. 3 provides a perspective view in the fore-aft direction of the shock cap assembly 102 as it is installed in the vehicle 100. As shown in FIG. 3, the various bolts 302 of the shock cap assembly 102 are accessible from sides of the vehicle 100, specifically via the wheel well 111 proximate the front wheels 112 of FIG. 1 of the vehicle 100, for installation, service, repair, and removal of the shock cap assembly 102. Also depicted in FIG. 3 is a front compartment rail 810.

FIG. 4 provides a perspective view in the cross-vehicle direction of the shock cap assembly 102 as it is installed in the vehicle 100. As shown in FIG. 4, the shock cap assembly 102 includes brackets 402 that provide structural support for the windshield base 403. In addition, also as shown in FIG. 4, in one embodiment, the shock cap assembly 102 is bolted into body 110 of the vehicle 100 with sets of both vertical bolts 404 and horizontal bolts 406, with a bolt spacing 408 that is maintained to distribute loads for the shock cap assembly 102, and with structural continuity with the windshield support structure 202 and the tower-to-tower brace 204. Specifically, in an exemplary embodiment, the spread 408 is maintained in both the fore-aft direction and the cross vehicle direction, by installing the different bolts 404, 406 in different directions at a given line of axis of the shock cap assembly 102 that are at least a predetermined angular difference from one another. In various embodiments, the spread 408 and bolt orientation allow sufficient tool access.

Figure 5:
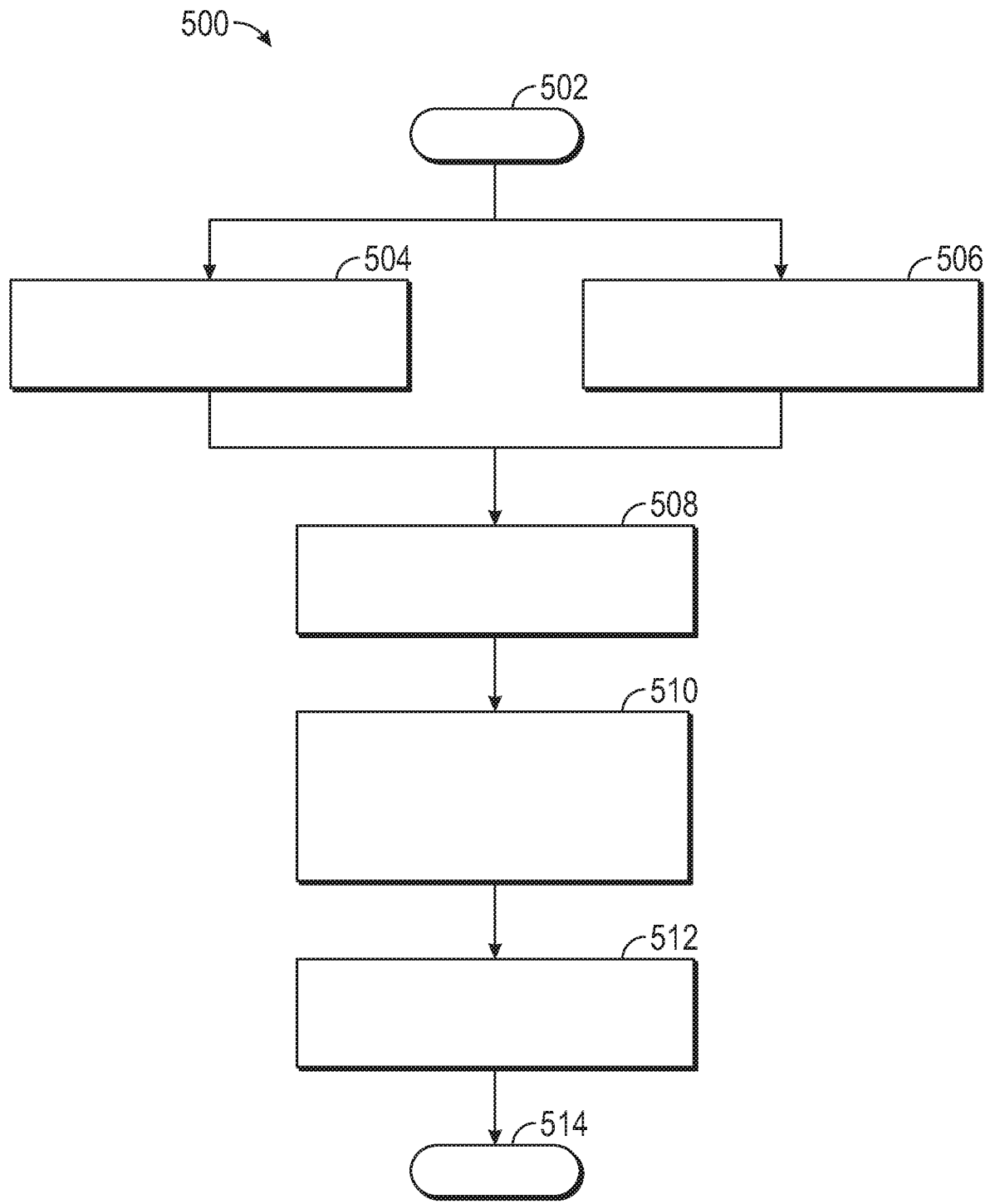
FIG. 5 is a flowchart of a process for installing a shock cap assembly in a vehicle, and that can be implemented in connection with the vehicle of FIG. 1 and the shock cap assembly of FIGS. 2-4, in accordance with an exemplary embodiment.

FIG. 5 is a flowchart of a process 500 for installing a shock cap assembly 102 in a vehicle 100, in accordance with an exemplary embodiment. In an exemplary embodiment, the process 500 can be implemented in connection with the vehicle 100 of FIG. 1 and the shock cap assembly 102 of FIGS. 2-4.

As depicted in FIG. 5, the process 500 begins at 502. In certain embodiments, the process 500 begins as manufacturing begins for a particular vehicle 100.

Figure 6:
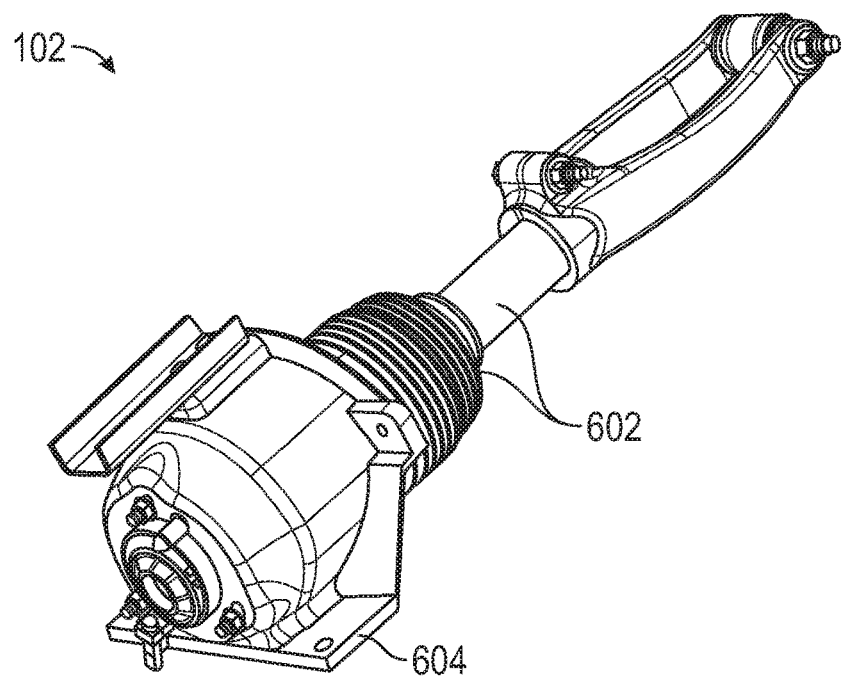
FIG. 6 is a perspective view of a shock cap assembly before installation into a vehicle, in accordance with the process of FIG. 5 and the shock cap assembly of FIGS. 1-4, in accordance with an exemplary embodiment.

In various embodiments, at 504, a strut component is assembled to a cap component, to produce the shock cap assembly 102 of FIGS. 1-4. With reference to FIG. 6, the shock cap assembly 102 is depicted with the strut component 602 attached to the cap component 604 following step 504.

Figure 7:
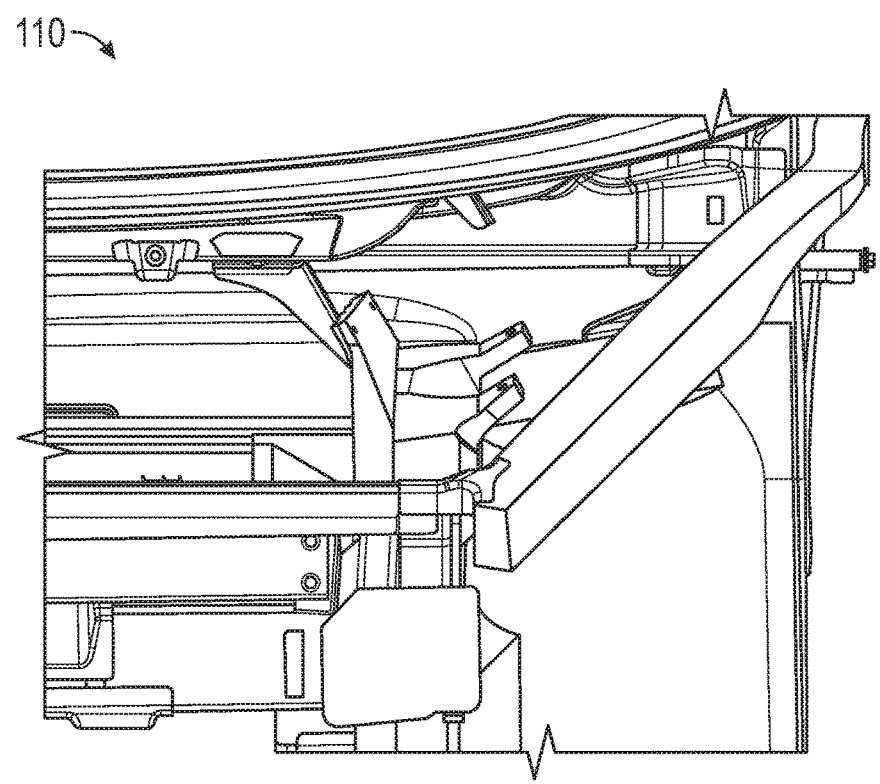
FIG. 7 is a perspective view of a vehicle body assembled before installation of the shock cap assembly, in accordance with the process of FIG. 5 and the vehicle of FIG. 1, in accordance with an exemplary embodiment.

With reference back to FIG. 5, also in various embodiment, separately, at 506, the body 110 of the vehicle 100 of FIG. 1 is assembled, separate from the shock cap assembly 102. With reference to FIG. 7, the body 110 of the vehicle 100 is shown as assembled following step 506, with the front vehicle structure but without the shock cap assembly 102. It will be appreciated that in various embodiments steps 504 and 506 may be performed in either order or simultaneously with one another in various embodiments. In addition, at 508 (or at 512, further below), various other components of the vehicle 100 may also be assembled, such as, by way of example, painting of the vehicle 100.

With further reference to FIG. 5, at 510 the shock cap assembly 102 is installed into the vehicle 100. For example, in various embodiments, during step 510, the shock cap assembly 102 of FIG. 7 is installed into the vehicle body 110 of FIG. 6, thereby resulting in the installed shock cap assembly 102 as installed into the vehicle 100 and depicted in FIGS. 2-4 and described above in connection therewith.

In various embodiments, during step 510, the installing of the shock cap assembly 102 into the body 110 of the vehicle is performed via access through a front wheel well of the vehicle (e.g., wheel well 111 of FIG. 1). Also in various embodiments, during step 510, the installing of the shock cap assembly 102 into the body 110 of the vehicle 100 comprises bolting the shock cap assembly 102 to the body 110 of the vehicle 100 via a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another (for example, as depicted in FIG. 4 and described above in connection therewith). In addition, also in an exemplary embodiment, the installing of the shock cap assembly 102 into the body 110 of the vehicle 100 during step 510 further comprises installing the shock cap assembly 102 into the body 110 of the vehicle underneath a front windshield 104 of the vehicle 100 that is disposed forward of a front axle 114 of the vehicle, as depicted in FIGS. 1 and 2 and described above in connection therewith.

In various embodiments, following step 510, other components are assembled (e.g., installation of suspension control arms, wheels, and tires) at 512. Also in various embodiments, the process 500 thereafter ends at 514, when the manufacturing of the vehicle 100 is complete.

As described in greater detail further below in connection with FIGS. 8-11, the process 500 results in a shock cap assembly 102 that is accessible via the wheel well 111 of the vehicle 100, and that also provides integral structural support for the windshield 104 via a torsional hoop structure, as well as contributing to overall body rigidity and managing the loads from the shocks.

Figure 8:
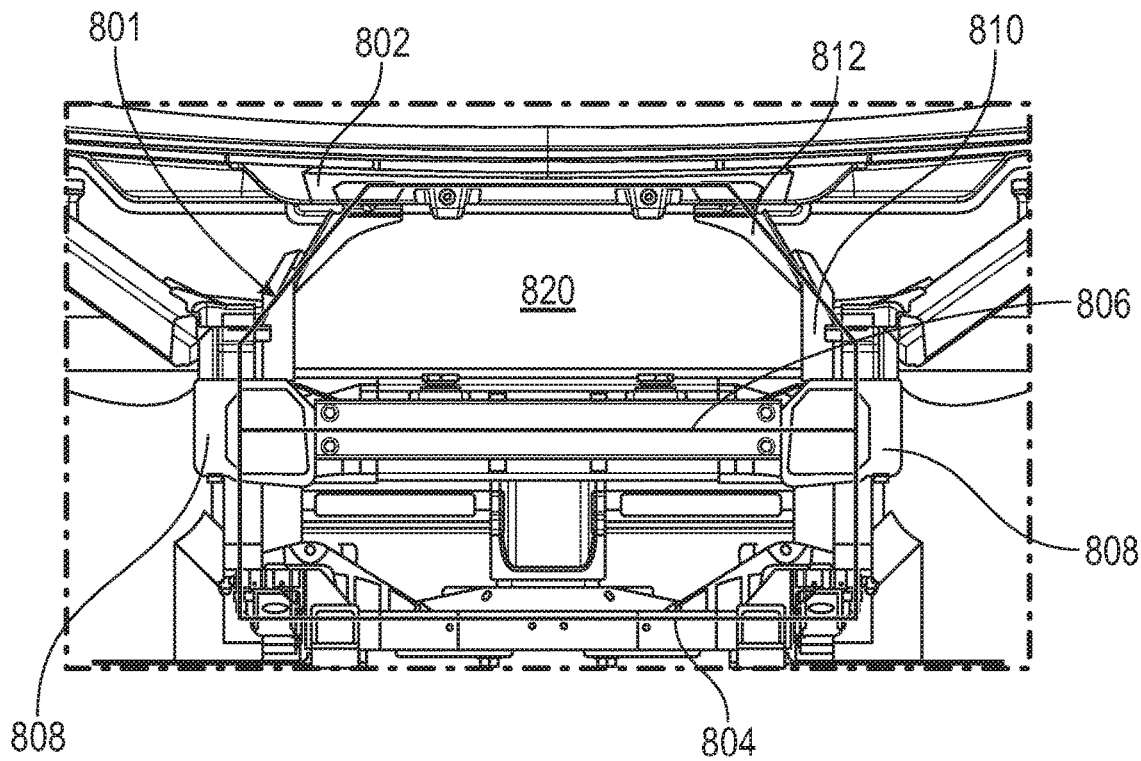
FIG. 8 is a front view of a torsional hoop structure for a front portion of a vehicle, prior to installation of the shock caps, in accordance with the process of FIG. 5, the vehicle of FIG. 1, and the shock cap assembly and components from FIGS. 1-4, 6, and 7, in accordance with an exemplary embodiment.
Figure 9:
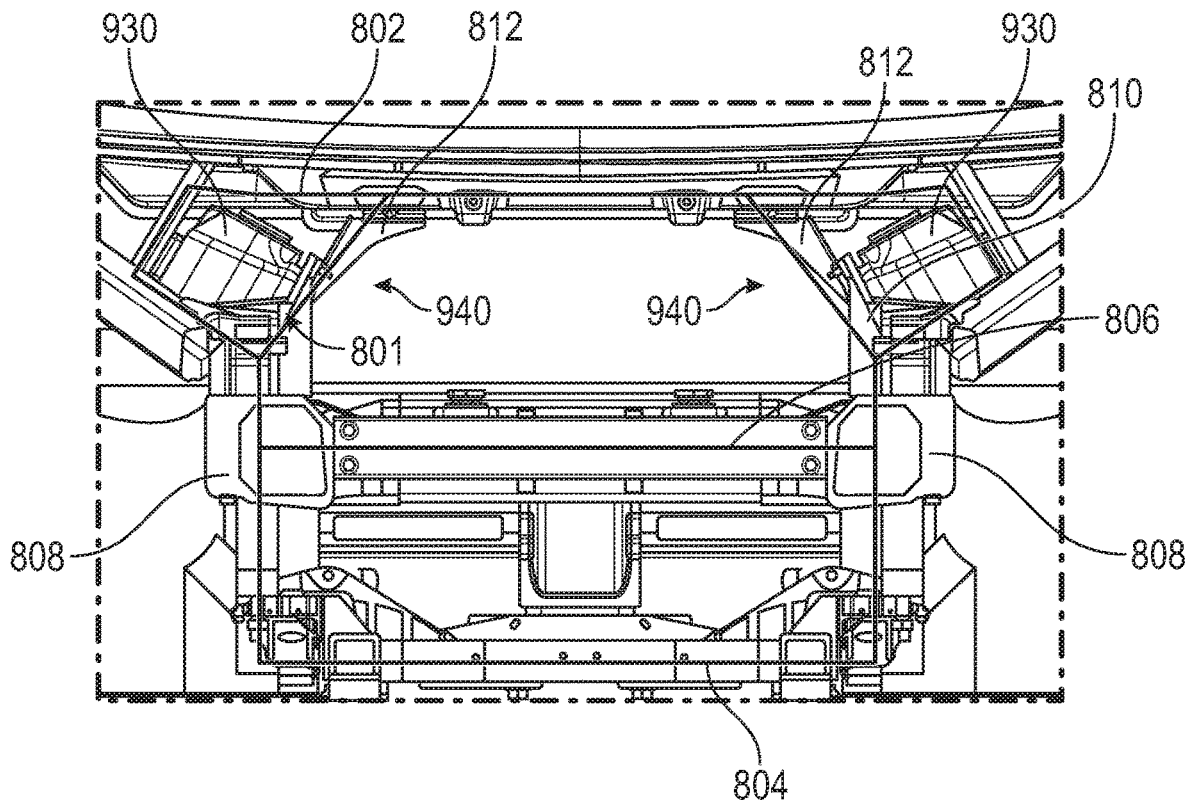
FIG. 9 is a front view of a torsional hoop structure for a front portion of a vehicle, after installation of the shock caps, in accordance with the process of FIG. 5, the vehicle of FIG. 1, and the shock cap assembly and components from FIGS. 1-4, and 6-8, in accordance with an exemplary embodiment.

FIGS. 8-9 provide perspective diagrams of a torsional hoop structure for a front portion of a vehicle (such as the vehicle 100 of FIG. 1), before and after the installation of the shock cap assembly 102 into the vehicle 100 during step 510 of FIG. 8.

Specifically, FIG. 8 is a front view of the torsional hoop structure 801 for a front portion of the vehicle 100, prior to installation of the shock cap assembly 102 of step 510, in accordance with an exemplary embodiment. In addition, FIG. 9 is a front view of the torsional hoop structure 801 for the front portion of the vehicle 100, after installation of the shock cap assembly 102 during step 510, also in accordance with an exemplary embodiment.

Figure 10:
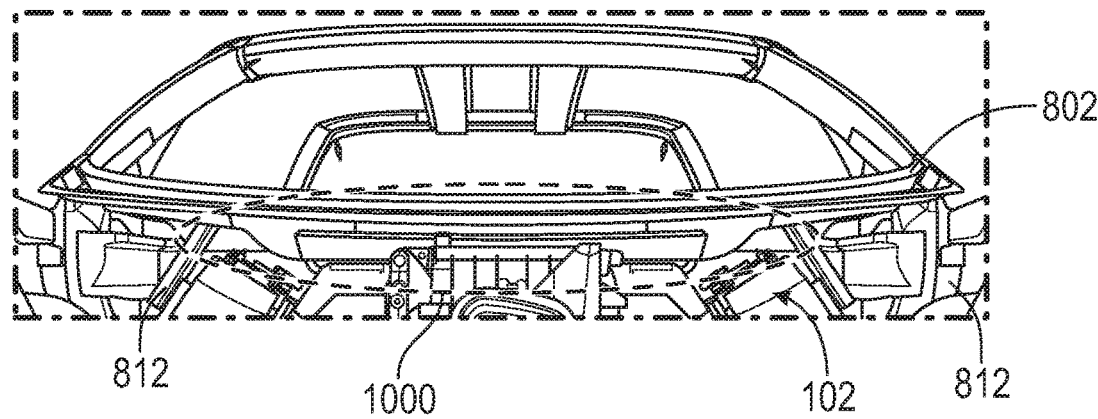
FIG. 10 is a front perspective view of a front portion of the vehicle, with the shock cap system installed, in accordance with the process of FIG. 5, the vehicle of FIG. 1, and the shock cap assembly and components from FIGS. 1-4, and 6-9, in accordance with an exemplary embodiment.
Figure 11:
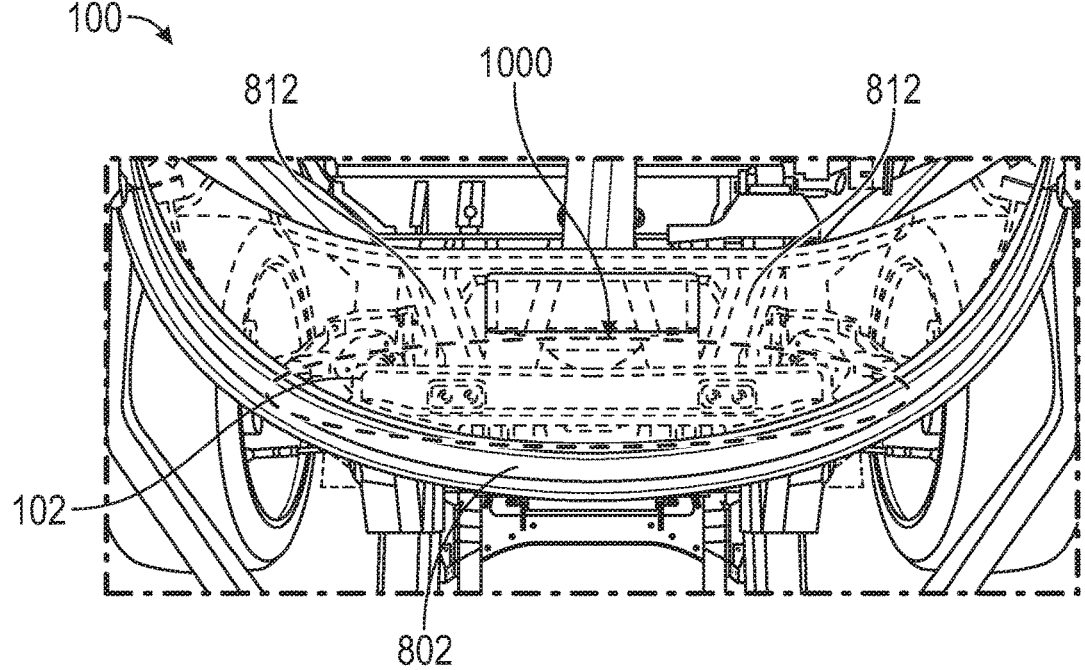
FIG. 11 is a top perspective view of a front portion of the vehicle, with the shock cap system installed, in accordance with the process of FIG. 5, the vehicle of FIG. 1, and the shock cap assembly and components from FIGS. 1-4, and 6-10, in accordance with an exemplary embodiment.

As shown in FIGS. 8-9, the torsional hoop structure 801 includes a windshield base structure 802 (e.g., corresponding to base of windshield support structure 202 of FIG. 2), a chassis 804, a longitudinal rail 808 (depicted in accordance with an end view in FIGS. 8 and 9), a front compartment rail 810 (e.g., which may be a casting in certain embodiments, and/or which may take another form, such as stampings, in other embodiments), and shock tower brackets 812 that connect the window base structure 802 with the shock caps 930 along with an integrated beam (e.g., corresponding to the integrated brace 204 of FIGS. 2 and 4 and the integrated brace 100 of FIGS. 10 and 11).

As shown in FIG. 8, the torsional hoop structure 801 comprises an incomplete loop 820 prior to the installation of the shock cap assembly 102 of step 510, due to a relatively weak connection in the upper corners. Conversely, as shown in FIG. 9, following the installation of the shock cap assembly 102 of step 510, respective shock caps 930 as shown in FIG. 9 are installed, closing the torsional loop structure with a completed loop 940, by creating a stiff, strong connection of the corners, precisely at the point of high loading.

In various embodiments, the torsional hoop structure 940 is formed by the integrated cross car beam (which is part of the windshield base structure) at the top, the chassis at the bottom, and the front compartment rails on the sides. Also in various embodiments, the shock cap assembly joins vertical members (namely, front compartment rails) to the upper horizontal member (namely, the integrated cross beam).

Also as depicted in FIGS. 8 and 9, in certain embodiments mid beam 806 may also be included, for example as a secondary member for various purposes, such as attachment of other components, as well as providing some structural support to the vehicle 100.

Further, with reference to FIGS. 10-11, the support structure for the shock cap assembly 102 as installed in the vehicle 100 is depicted with greater detail, and is described below in connection therewith. Specifically, (i) FIG. 10 is a front perspective view, and (ii) FIG. 11 is a top perspective view, both of the front portion of the vehicle, with the shock cap system 102 installed, in accordance with the process 500 of FIG. 5, the vehicle 100 of FIG. 1, and the shock cap assembly 102 and components from FIGS. 1-4, and 6-9, in accordance with an exemplary embodiment.

As depicted in FIGS. 10 and 11, the shock cap assembly 102 provides an integrated brace for the vehicle 100, as the shock cap assembly 102 is installed into the windshield base structure 802. Specifically, in various embodiments, as the shock cap assembly 102 is installed underneath the windshield 104, combined with the shock tower brackets 812 (from FIGS. 8 and 9) provides cross-vehicle support for the windshield 104, in the form of an integrated brace 1000 for the windshield 104 (e.g., as the integrated brace 1000 is integrated into the windshield base structure 802). In various embodiments, the integrated brace 1000 (which may correspond in various embodiments to the integrated brace 204 of FIGS. 2 and 4) is generated from the position of the shock cap assembly 102 under the windshield 104 and the integration into the windshield base structure 802, along with the shock tower brackets 1002. Also in various embodiments, this configuration provides for a dual-purpose, integrated cross vehicle brace with the windshield support structure 802, to provide structural continuity for the windshield 104 and between the shock tower brackets 812, in an exemplary embodiment. In addition, also in an exemplary embodiment, the high location of the integrated brace 1000 also potentially improves packaging for other components of the vehicle such as, by way of example, an HVAC system for the vehicle 100.

In various embodiments, the support structure provided by the integrated brace 1000 of this configuration provides additional structural support for the windshield 104, which may be needed as a result of the windshield being cantilevered due to its placement forward of the front axle 114 of the vehicle 100. In addition, this configuration with the integrated brace 1000 (including the hoop structure with the cross-support shock tower brackets 812) further provides structural continuity between the shock cap assembly 102 and the windshield base structure 802, without requiring redundant structure for cross-support. In short, in an exemplary embodiment, integral support is provided as the shock cap assembly 102 provides structural support for the windshield 104 (e.g., via the brackets 812 of FIGS. 8 and 9), and the windshield base structure 802 in turn provides structural support for the shock cap assembly 102.

In various embodiments, the torsional hoop structure is formed by the integrated cross car beam 1000 (which is part of the windshield base structure) at the top, the chassis 804 at the bottom, and the front compartment rails 810 on the sides. Also in various embodiments, in so doing, the shock cap assembly 102 joins vertical members (namely, front compartment rails 810) to the upper horizontal member (namely, the integrated cross beam 1000). In various embodiments, the torsional hoop structure not only provides structural support for the windshield 104, but also contributes to the overall body rigidity for the vehicle 100 and manages loads from the shocks.

In addition, as noted above, in certain embodiments mid beam 806 may also be included, for example as a secondary member for various purposes, such as attachment of other components, as well as providing some structural support to the vehicle 100.

Accordingly, systems, methods, and vehicle are provided for shock cap assemblies installed in vehicles. In various embodiments, the shock cap assemblies are sub-assembled prior to installation in the vehicle. Also in various embodiments, the configuration of the shock cap assemblies as installed in the vehicle enables the shock cap assembly to be accessed from the side of the vehicle, via a vehicle wheel well, for installation, service, repair, and removal. This is particularly useful for, but is not limited to, configurations in which the windshield covers the shock towers from above, and/or in which a vehicle floor, occupant compartment, and/or other vehicle components may preclude access from above.

In addition, in various embodiments, the installed shock cap assembly includes an integrated beam connected to the shock tower to complete a torsional hoop structure that results in an integrated support system for the shock cap assembly and the windshield support structure, by which the windshield base structure and shock cap assembly mutually support one another in an integrated manner. In addition, in various embodiments, the installation of the shock cap assembly in the vehicle utilized with an integrated cross-vehicle brace in the windshield support structure provides structural continuity without the need for a separate structure element, such as a separate tower-to-tower brace. In various embodiments, the torsional hoop structure also contributes to overall body rigidity and managing loads from shocks of the vehicle 100.

It will be appreciated that the systems, vehicles, methods, applications, and implementations may vary from those depicted in the Figures and described herein. For example, in various embodiments, the vehicle 100, the shock cap assembly 102, the windshield 104, and/or various components thereof, and/or other components may differ from those depicted in FIGS. 1-11 and/or described above in connection therewith. It will also be appreciated that the steps of the process 500 may differ, and/or that various steps thereof may be performed simultaneously and/or in a different order, than those depicted in FIG. 5 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A shock cap assembly for a suspension system of a vehicle, the shock cap assembly comprising:
   a strut component;
   a cap component attached to the strut component; and
   an attachment mechanism configured for attachment to a body of the vehicle, such that the shock cap assembly is configured to be accessed from a front wheel well of the vehicle, wherein the attachment mechanism comprises a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another.

2. The shock cap assembly of claim 1, wherein the shock cap assembly is configured to be installed underneath a front windshield of the vehicle.

3. The shock cap assembly of claim 2, wherein the shock cap assembly is configured to be installed underneath the front windshield of the vehicle when the front windshield is disposed forward of a front axle of the vehicle.

4. The shock cap assembly of claim 2, further comprising:
   a plurality of shock cap brackets configured to connect an integrated cross beam to shock caps of the shock cap assembly and integrated into the base of windshield.

5. The shock cap assembly of claim 4, further comprising:
   a plurality of shock tower brackets configured to attach to the shock caps and to attach to a windshield base structure of the front windshield.

6. The shock cap assembly of claim 5, wherein the integrated cross-beam, along with a chassis and front compartment rails, form a torsional hoop structure that provides mutual support between the shock cap assembly and the windshield base structure.

7. A method comprising:
   assembling a strut component of a suspension system for a vehicle to a cap component of the suspension system for the vehicle, generating a shock cap assembly for the vehicle;
   assembling a body for the vehicle, separate from the shock cap assembly; and
   installing the shock cap assembly into the body of the vehicle, subsequent to both the assembling of the shock cap assembly and the assembling of the body for the vehicle, wherein the installing of the shock cap assembly into the vehicle comprises bolting the shock cap assembly to the body of the vehicle via a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another.

8. The method of claim 7, wherein the installing of the shock cap assembly into the body of the vehicle comprises installing the shock cap assembly into the body of the vehicle via access through a front wheel well of the vehicle.

9. The method of claim 7, wherein the installing of the shock cap assembly into the body of the vehicle comprises installing the shock cap assembly into the body of the vehicle underneath a front windshield of the vehicle that is disposed forward of a front axle of the vehicle.

10. The method of claim 9, wherein the step of the installing of the shock cap assembly into the body of the vehicle includes connecting an integrated cross beam to shock caps of the shock cap assembly via a plurality of shock cap brackets and integrated into a base of windshield of the front windshield.

11. The method of claim 10, wherein the integrated cross-beam, along with a chassis and front compartment rails, form a torsional hoop structure that provides mutual support between the shock cap assembly and a windshield base structure of the front windshield.

12. A vehicle comprising:
    a body;
    a drive system configured to propel the body; and
    a suspension system coupled to the drive system, the suspension system including a shock cap assembly comprising:
       a strut component;
       a cap component attached to the strut component; and
       an attachment mechanism configured for attachment to a body of the vehicle, such that the shock cap assembly is configured to be accessed from a front wheel well of the vehicle, wherein the attachment mechanism comprises a first plurality of substantially horizontal bolts and a second plurality of substantially vertical bolts that maintain a spread in both a fore-aft direction and a cross vehicle direction in different directions at a given line of axis of the shock cap assembly that are at least a predetermined angular difference from one another.

13. The vehicle of claim 12, further comprising:
    a front windshield;
    wherein the shock cap assembly is disposed underneath the front windshield.

14. The vehicle of claim 13, wherein the front windshield is disposed forward of a front axle of the vehicle.

15. The vehicle of claim 13, wherein:
    the front windshield includes a windshield base structure; and
    the vehicle further includes an integrated cross beam connected to shock caps of the shock cap assembly via a plurality of shock cap brackets and integrated into the base of windshield.

16. The vehicle of claim 15, wherein the shock caps are attached to the windshield base structure via a plurality of shock tower brackets.

17. The vehicle of claim 16, wherein the integrated cross-beam, along with a chassis and front compartment rails, form a torsional hoop structure that provides mutual support between the shock cap assembly and the windshield base structure.

* * * * *